United States Patent [19]

Peck

[11] Patent Number: 4,580,746

[45] Date of Patent: Apr. 8, 1986

[54] CAPSULE AND ROCKET EXTRACTION SYSTEM

[75] Inventor: Walter R. Peck, Asheville, N.C.

[73] Assignee: Stencel Aero Engineering Corporation, Arden, N.C.

[21] Appl. No.: 499,494

[22] Filed: May 31, 1983

[51] Int. Cl.$^4$ ............................................. B64D 25/12
[52] U.S. Cl. .............................. 244/140; 244/122 AE; 244/120
[58] Field of Search ........ 244/122 R, 122 A, 122 AE, 244/122 AB, 122 AC, 122 AD, 122 AF, 140, 141, 120

[56] References Cited

U.S. PATENT DOCUMENTS

| | | | |
|---|---|---|---|
| 2,591,867 | 4/1952 | Prower et al. | 244/140 |
| 2,702,680 | 2/1955 | Heinemann et al. | 244/140 |
| 2,806,666 | 9/1957 | Brown et al. | 244/140 |
| 2,853,258 | 9/1958 | Polleys | 244/122 |
| 2,941,764 | 6/1960 | Lee, Jr. et al. | 244/140 |
| 3,067,973 | 12/1962 | Halsey et al. | 244/140 |
| 3,433,440 | 3/1969 | Stanley | 244/122 AD |
| 3,756,546 | 9/1973 | Carson, Jr. et al. | 244/138 R |
| 3,881,671 | 5/1975 | Bouchnik | 244/140 |
| 3,999,728 | 12/1976 | Zimmer | 244/140 |
| 4,017,040 | 4/1977 | Dillinger et al. | 244/122 AD |
| 4,057,206 | 11/1977 | Duncan et al. | 244/122 AE |
| 4,395,001 | 7/1983 | Stone et al. | 244/122 AE |

FOREIGN PATENT DOCUMENTS 942751 2/1949 France .
75013 of 1961 France .................. 244/140

OTHER PUBLICATIONS

C. J. Cohan et al., Crew Escape Criteria for Two Stage Recoverable Aerospace Vehicles, Oct. 1964, pp. 36–44, Technical Documentary Report No. FDL-TDR 64-145, Defense Technical Information Center.

Primary Examiner—Galen L. Barefoot
Attorney, Agent, or Firm—Roylance, Abrams, Berdo & Goodman

[57] ABSTRACT

A capsule and rocket extraction system for providing an inflight escape system for the pilot of a damaged aircraft. The system comprises a capsule that is separable from the main fuselage of the aircraft and a rocket for extracting the pilot from the capsule. A control system is carried by the capsule for sensing the capsule's speed, altitude and attitude, and for actuating only the rocket to extract the pilot directly from the capsule when the speed, altitude and attitude are at predetermined conditions, and for sequentially actuating a capsule separation device to separate the capsule from the main fuselage and then actuating the rocket to extract the pilot from the separated capsule when the speed, altitude and attitude are at different predetermined conditions.

15 Claims, 14 Drawing Figures

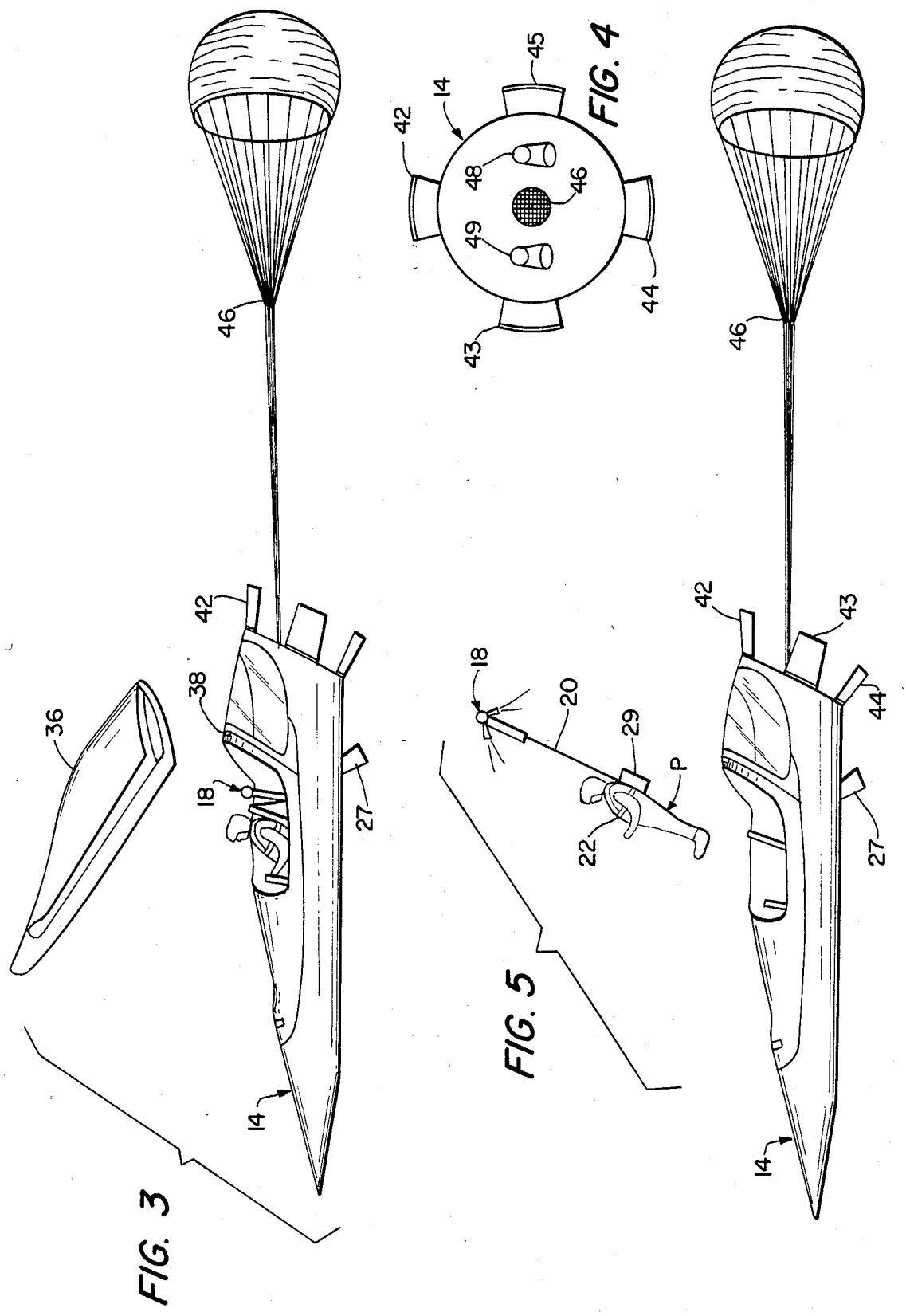

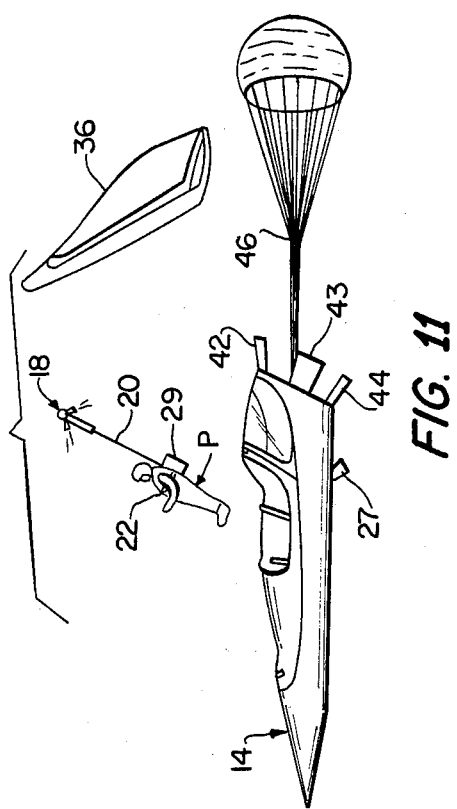
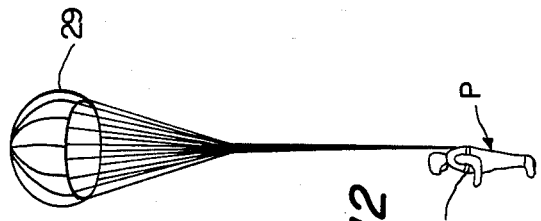
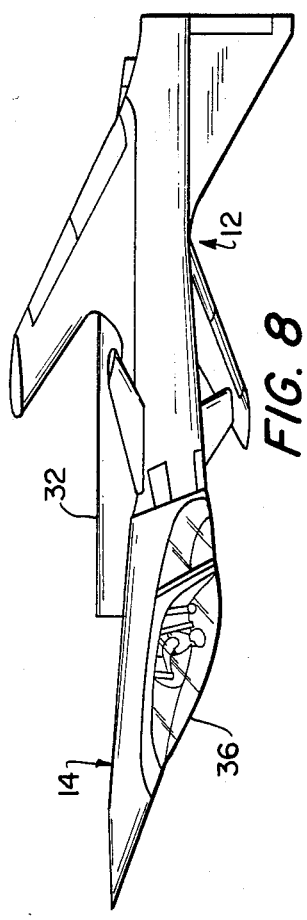
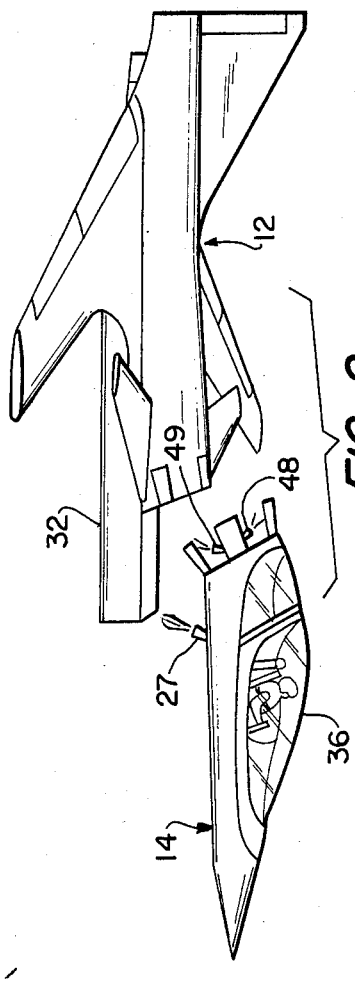
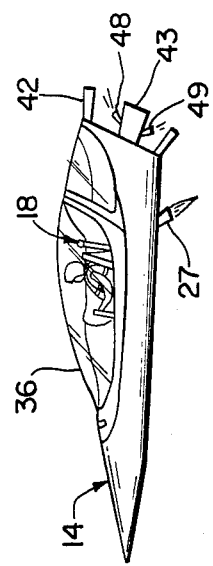

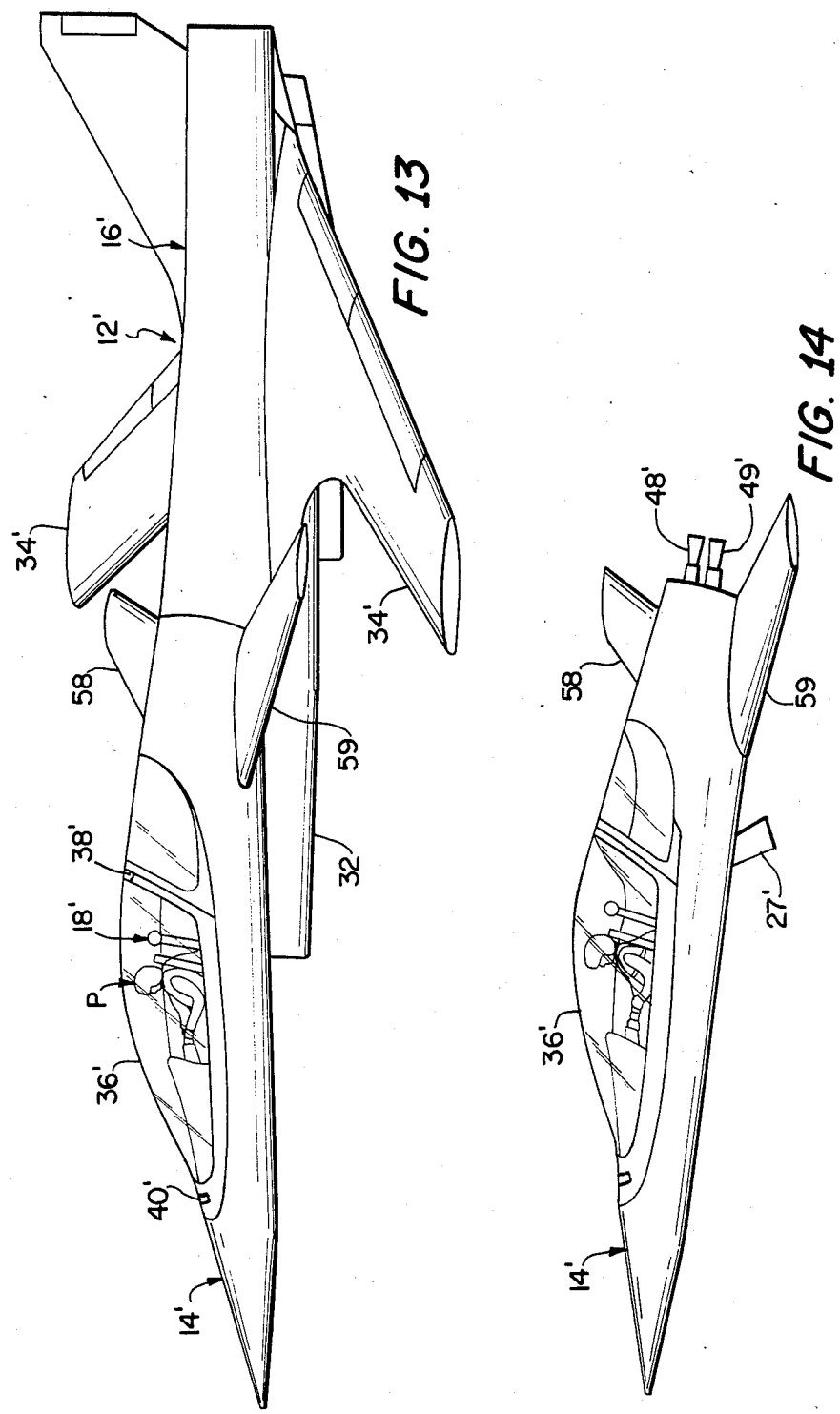

CAPSULE AND ROCKET EXTRACTION SYSTEM

FIELD OF THE INVENTION

The invention relates to an inflight escape system for the pilot of a damaged aircraft. In particular the system includes a capsule that is separable from the main fuselage of the aircraft and a rocket for extracting the pilot from the capsule. The rocket can be used to extract the pilot whether or not the capsule is separated from the fuselage, such separation depending upon speed, altitude and attitude conditions.

BACKGROUND OF THE INVENTION

Numerous systems are known for providing an inflight escape system for the pilot and other crew members of a damaged or otherwise crippled aircraft. Traditionally, these systems include some type of extraction assembly for removing the pilot from the damaged aircraft and for deploying a parachute so that the pilot can safely return to the earth. Typical extraction systems include ejection seats powered by catapults and tractor rockets for directly pulling the pilot from the aircraft.

These direct extraction systems are reasonably safe when the aircraft speed and altitude are below, for example, 300 knots effective air speed (KEAS) and below 15,000 feet. Unfortunately, if these values are higher and the pilot is directly extracted from the aircraft, then the pilot can be severely injured due to the extremely high air stream speed, the high dynamic pressure, the extreme cold and the low atmospheric pressure at such speeds and altitudes.

To overcome these safety problems resulting from direct extraction of a pilot at high speed and altitude, known systems have provided a self-contained capsule that is separable from the main part of the aircraft and provides protection against the adverse effects on the pilot. Typically, however, the use of such capsules creates additional problems. That is, some of the capsules utilize a capsule parachute so that the pilot must stay with the capsule until the capsule reaches the earth. As a result of this, the pilot has little control over the actual landing and there is little shock absorption provided.

Other systems utilizing capsules incorporate independent flight capability including wings and an engine; however, this is very expensive, adds great weight to the aircraft and leaves the pilot with no alternative if this backup system provided by the capsule fails.

Moreover, these prior systems do not provide any flexibility in escaping a damaged aircraft since they provide either direct extraction at low speeds and altitudes or capsule use at reasonably high speeds and altitudes.

Examples of these prior systems are disclosed in U.S. Pat. Nos. 2,591,867 to Prower et al; 2,702,680 to Heinemann et al; 2,806,666 to Brown et al; 2,853,258 to Polleys; 3,067,973 to Halsey et al; 3,756,546 to Carson, Jr. et al; and 3,999,728 to Zimmer; and French Pat. No. 942,751 to Rousselot et al.

Accordingly, there is need for improvement in inflight escape systems for safely returning the pilot and crew members of a damaged aircraft to the earth.

SUMMARY OF THE INVENTION

Accordingly, a primary object of the invention is to provide an inflight escape system for the pilot and crew members of a damaged aircraft that can be utilized at both high and low speeds and high and low altitudes.

Another object of the invention is to provide an inflight escape system that includes a capsule that is separable from the main fuselage of the aircraft and a rocket for extracting the pilot from the capsule.

Another object of the invention is to provide such a capsule and rocket system where the rocket can be used to extract the pilot whether or not the capsule is separated from the fuselage, such separation depending upon speed, altitude and attitude conditions.

Another object of the invention is to provide a capsule and rocket extraction system where the capsule is generally aerodynamically stable and where an individual parachute is provided to each of the crew members.

The foregoing objects are basically attained in an aircraft having a main fuselage and a capsule separably coupled to the fuselage and carrying the pilot, the improvement comprising: a separation system, coupled to the capsule, for separating the capsule from the main fuselage; a powered extraction system, coupled to the capsule and coupled to the pilot for extracting the pilot from the capsule; and a control system coupled to the capsule for sensing capsule speed, altitude and attitude, and for actuating only the extraction system to extract the pilot from the capsule when the capsule speed, altitude and attitude are at predetermined conditions, and for sequentially actuating the separation system to separate the capsule from the main fuselage and then actuating the extraction system to extract the pilot from the separated capsule when the capsule speed, altitude and attitude are at different predetermined conditions.

For example, when the damaged aircraft is below 300 KEAS and below 15,000 feet, the control system can actuate the extraction system to directly extract the pilot from the capsule without first separating the capsule from the main fuselage. On the other hand, when the damaged aircraft is travelling above 300 KEAS and above 15,000 feet, then the control system will sequentially actuate the separation system to separate the capsule from the main fuselage first and then actuate the extraction system to directly extract the pilot from the separated capsule. Moreover, if the damaged aircraft is below 300 KEAS and below 15,000 feet but is in an inverted condition, then advantageously the control system will sense this inverted attitude and will first actuate the separation system to separate the capsule from the main fuselage. Since the capsule can be provided with thrust vector control rockets, the capsule can be righted after separation and then the extraction system can be actuated to extract the pilot from the separated and now righted capsule.

Other objects, advantages and salient feature of the invention will become apparent from the following detailed description which, taken in conjunction with the annexed drawings, discloses preferred embodiments of the invention.

DRAWINGS

Referring now to the drawings which form a part of this original disclosure:

FIG. 3 is an elevational view similar to that shown in FIG. 2 except that a drogue chute has been deployed from the capsule and the canopy covering the pilot has been removed from the capsule;

FIG. 4 is an end elevational view of the aft section of the capsule showing the four stabilizing flaps and the two universally controllable thrust vector rockets;

FIG. 5 is an elevational view similar to FIG. 3 except that the tractor rocket has extracted the pilot from the capsule, the pilot carrying a parachute for safe return to the earth;

FIG. 8 is a side elevational view similar to FIG. 1 except that the damaged aircraft is inverted;

FIG. 9 is an elevational view similar to FIG. 8 except that the capsule has been separated from the main fuselage of the aircraft in the inverted condition;

FIG. 10 is an elevational view of the now righted capsule which has accomplished this by rotating through 180° about the roll axis by actuation of two aft thrust vector control rockets;

FIG. 11 is an elevational view of the capsule similar to FIG. 10 except that the drogue chute has been deployed, the canopy has been removed, and the tractor rocket has extracted the pilot from the capsule, the pilot carrying a parachute;

FIG. 12 is an elevational view of the pilot safely returning to earth below the deployed parachute;

FIG. 13 is an elevational view of a modified capsule having controllable canard surfaces instead of stabilization flaps; and FIG. 14 is an elevational view of the capsule shown in FIG. 13 separated from the main fuselage and utilizing the controllable canard surfaces to stabilize its descent.

DETAILED DESCRIPTION OF THE INVENTION

Figure 6:
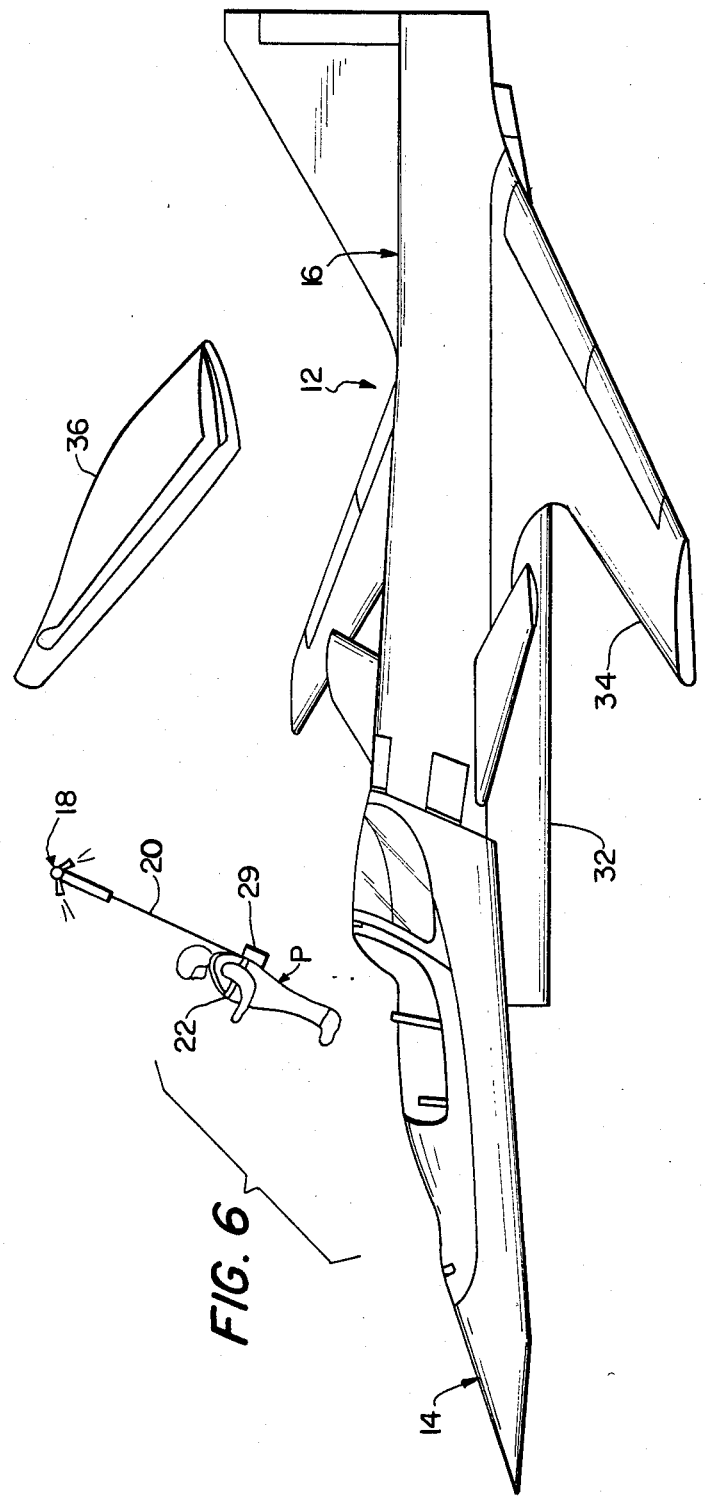
FIG. 6 is a side elevational view similar to FIG. 1 except that the canopy has been removed and the pilot extracted directly by the tractor rocket without separation of the capsule.
Figure 7:
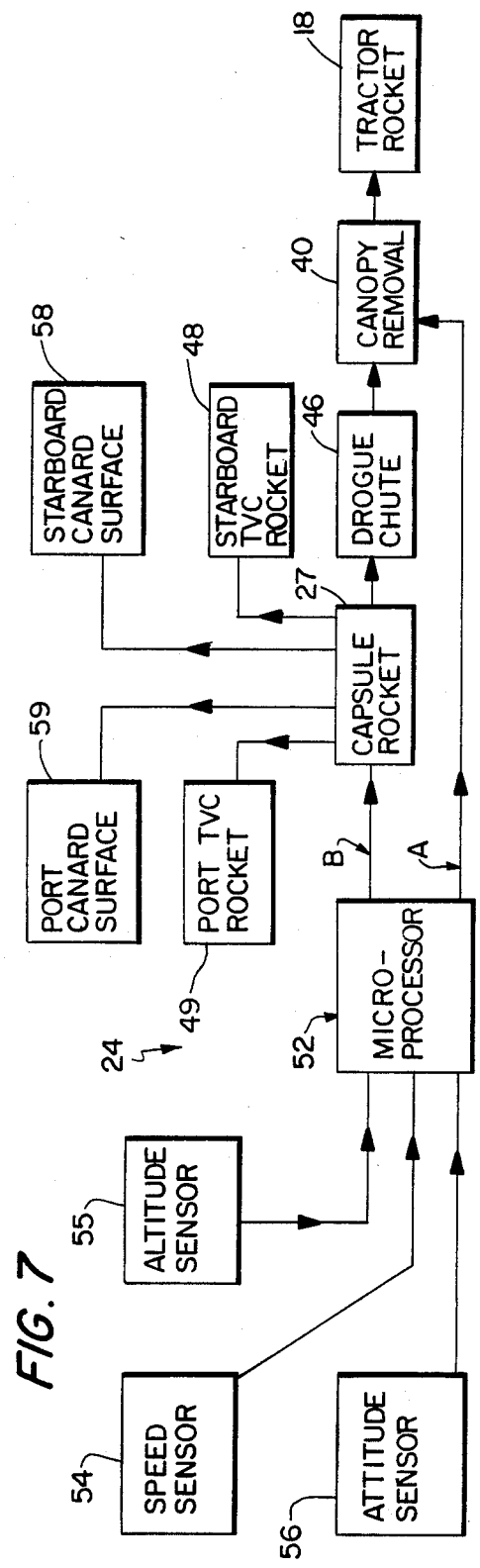
FIG. 7 is a schematic diagram of the control system for sensing speed, altitude and attitude and for actuating the capsule and rocket extraction system as required according to the speed, altitude and attitude conditions.

Referring now to FIGS. 1-12, the capsule and rocket extraction system 10 in accordance with the invention is shown in use on an aircraft 12 and comprises a capsule 14 separably coupled to a main fuselage 16 and a tractor rocket 18 coupled to the capsule and coupled to the pilot P by means of a pendant line 20 connected to a harness 22 worn by the pilot. As shown in FIG. 7, a control system 24 is carried in the capsule 14 for sensing speed, altitude and attitude of the capsule. Depending upon the conditions so sensed, the control system 24 will either actuate only the extraction system including the tractor rocket 18 to directly extract the pilot from the capsule as seen in FIG. 6, or will sequentially actuate a separation system 26 including a separation rocket 27 to separate the capsule from the main fuselage and then actuate the tractor rocket 18 to extract the pilot from the now separated capsule as illustrated in the sequence shown in FIGS. 2, 3 and 5 and FIGS. 8-12. In either event, once the pilot is extracted from the capsule via the tractor rocket 18, the pilot can safely return to earth upon deployment of a parachute 29 connected to the harness 22 as seen in FIGS. 5 and 6 as well as FIGS. 11 and 12.

Figure 1:
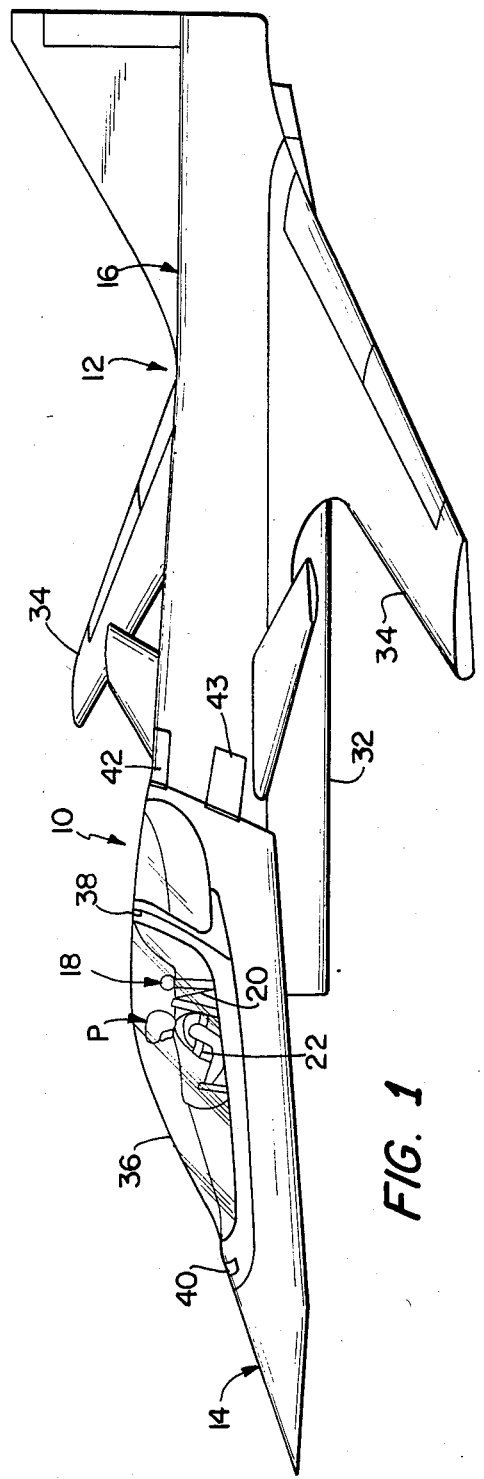
FIG. 1 is a side elevational view of an aircraft having the capsule and rocket extraction system in accordance with the invention incorporated therein.

Referring now to FIG. 1, the aircraft 12 is shown comprising the capsule 14 which incorporates a typical cockpit and the main fuselage 16 which includes a suitable engine 32 and wings 34.

The capsule 14 is conically shaped and is separably coupled to the main fuselage 16 by any suitable releasable mechanism such as explosive bolts or shearable connectors such as those disclosed in U.S. Pat. No. 3,999,728 to Zimmer, the disclosure of which is hereby incorporated by reference. The capsule 14 carries the pilot P therein with the pilot wearing the harness 22 which is coupled via line 20 to the tractor rocket 18. Covering the pilot and releasably coupled to the capsule is a canopy 36. This canopy has, for example, a breakaway hinge 38 at the aft end and thrusters 40 at the fore end in a conventional manner so that the canopy can be released and separated from the capsule when desired. This is accomplished by firing the thrustors 40 to open the fore end of the canopy from the capsule, after which the air stream will pivot the canopy rearwardly as seen in FIG. 3 at which time hinge 38 breaks to release and separate the canopy from the capsule.

As seen in FIGS. 1-4, the aft end of the capsule 14 has a plurality of stabilizing flaps 42-45 hingeably connected thereto which are outwardly biased and then fixed in place upon positive acceleration of the capsule upwardly and forwardly from the main fuselage in a conventional manner.

A drogue chute 46 seen in FIGS. 3 and 5 is also coupled to the aft section of the capsule and is rearwardly deployable therefrom to slow the capsule.

In addition, the aft section of the capsule 14 has a pair of universally controllable thrust vector control rockets 48 and 49 coupled thereto to control the attitude of the capsule once separated from the fuselage along the yaw, roll and pitch axes.

The extraction system thus includes the canopy 36, thrustor 40 and hinge 38 as well as the tractor rocket 18, line 20 and harness 22. The tractor rocket can be constructed in accordance with the devices shown and described by U.S. Pat. Nos. 3,424,409 and 3,433,440 to Stanley and 3,442,473 to Rivedal et al, the disclosures of which are hereby incorporated by reference.

Referring to FIG. 7, the control system 24 is shown comprising a conventional microprocessor 52 carried in the capsule 14 and having coupled thereto and carried by the capsule a speed sensor 54, an altitude sensor 55, and an attitude sensor 56. The microprocessor 52 is also connected to actuate the capsule rocket 27 to separate the capsule from the main fuselage, the thrustors 40 to remove the canopy from the capsule, the drogue chute 46 to deploy that chute and the tractor rocket 18 to actuate that rocket. In addition, the microprocessor 52 can actuate and control the port and starboard thrust vector control rockets 48 and 49 once the capsule is separated from the main fuselage.

As illustrated in FIG. 7, the microprocessor, depending upon predetermined conditions regarding speed, altitude and attitude of the capsule, can operate in Mode A to only remove the canopy and deploy the drogue chute add the tractor rocket or in Mode B to separate the capsule from the fuselage, stabilize the capsule via the thrust vector control rockets, then remove the canopy, deploy the drogue chute and actuate the tractor rocket as required.

Figure 2:
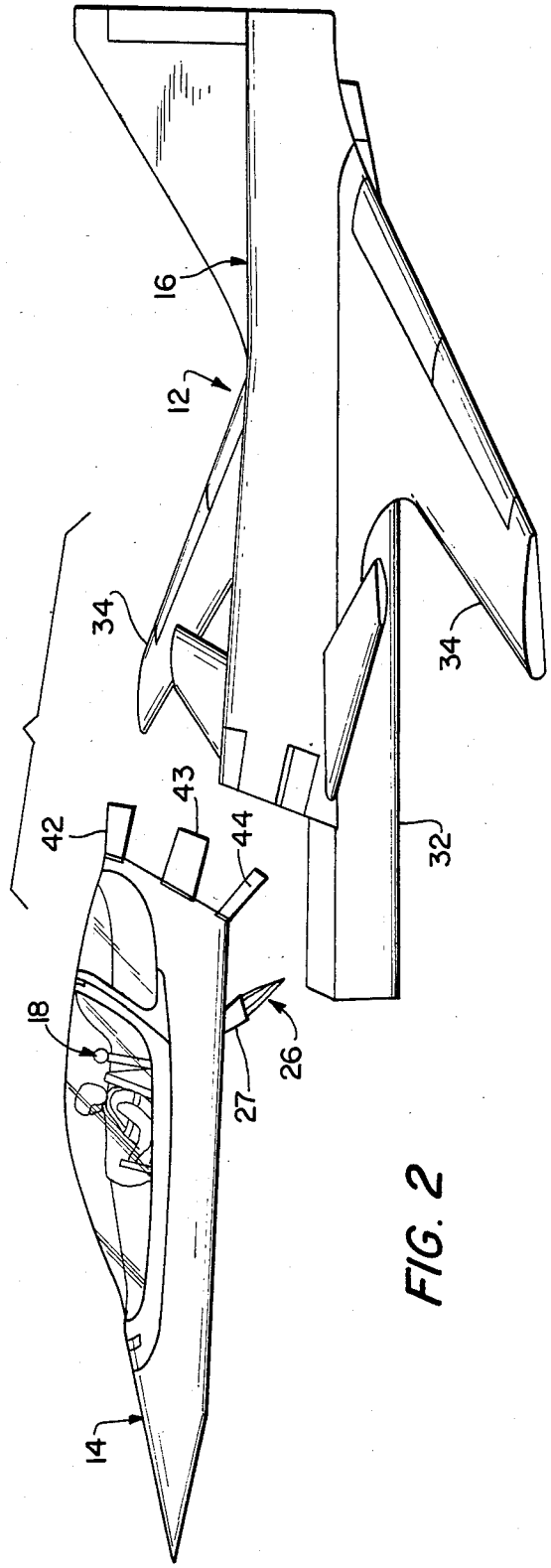
FIG. 2 is an elevational view similar to that shown in FIG. 1 except that the capsule has been separated from the main fuselage of the aircraft.

Advantageously, the microprocessor 52 is activated in Mode A as illustrated in FIG. 6 when the damaged aircraft is travelling below 300 KEAS and 15,000 feet, since the pilot can be safely directly extracted via the tractor rocket 18 under these conditions. On the other hand, Mode B is used as illustrated in FIGS. 2, 3 and 5 if the aircraft is above 300 KEAS and 15,000 feet to protect the pilot until the capsule slows to below 300 KEAS and falls below 15,000 feet at which time the canopy is removed and the tractor rocket actuated. In addition, Mode B can be used when the aircraft is below 300 KEAS and below 15,000 feet if the aircraft and capsule are inverted as seen in FIGS. 8 and 9, since the thrust vector control rockets 48 and 49 can be used to right the capsule as seen in FIGS. 9 and 10. The canopy is then removed, the drogue chute deployed and the pilot extracted as seen in FIG. 11 so the pilot can deploy parachute 29 and safely return to earth as seen in FIG. 12.

EMBODIMENT OF FIGS. 13 AND 14

As seen in FIGS. 13 and 14, the capsule and rocket extraction system in accordance with the invention is modified to the extent that the stabilizing flaps 42–45 shown in FIGS. 1–6 and 8–12 are replaced by a pair of pivotably coupled controllable canard surfaces 58 and 59, which are coupled adjacent the aft section of the capsule. Like elements described above are given reference numerals with the addition of a prime in FIGS. 13 and 14. The embodiment shown in FIGS. 13 and 14 functions in a manner similar to that disclosed in FIGS. 1–6 and 8–12 and described above except that the microprocessor 52 in Mode B also controls the pivotable positioning of the canard surfaces 58 and 59 as shown in FIG. 7. By using the canard surfaces 58 and 59, additional stability and control can be provided to the capsule when it is separated from the main fuselage.

While advantageous embodiments have been chosen to illustrate the invention, it will be understood by those skilled in the art that various changes and modifications can be made therein without departing from the scope of the invention as defined in the appended claims.

What is claimed is:

1. In an aircraft having a main fuselage and a capsule separably coupled to the fuselage and carrying the pilot, the improvement comprising:
    separation means, coupled to the capsule, for separating the capsule from the main fuselage;
    powered extraction means, coupled to the capsule and coupled to the pilot, for extracting the pilot from the capsule;
    means, coupled to the capsule, for changing the capsule speed, altitude and attitude once the capsule is separated from the fuselage; and control means, coupled to the capsule, for
    (A) sensing capsule speed, altitude and attitude,
    (B)(1) actuating only said extraction means to extract the pilot from the capsule when the capsule speed, altitude and attitude are at predetermined conditions, and
    (B)(2)(a) sequentially actuating said separation means to separate the capsule from the main fuselage when the capsule speed, altitude and attitude are at different predetermined conditions,
    (B)(2)(b) actuating said changing means to change the capsule speed, altitude and attitude as necessary to be within the predetermined conditions, and
    (B)(2)(c) then actuating said extraction means to extract the pilot from the separated capsule when the capsule speed, altitude and attitude are at said predetermined conditions.

2. The improvement according to claim 1, wherein said capsule includes a canopy overlying the pilot, said extraction means includes means for removing said canopy from said capsule.

3. The improvement according to claim 1, wherein said extraction means comprises a tractor rocket.

4. The improvement according to claim 1, wherein said changing means includes a rocket for positively accelerating said capsule forward and upward relative to said main fuselage.

5. The improvement according to claim 1, wherein said changing means includes a plurality of thrust vector control rockets for adjusting the attitude of said capsule along the yaw, pitch and roll axes thereof.

6. The improvement according to claim 1, wherein said capsule includes a plurality of stabilizing flaps.

7. The improvement according to claim 1, wherein said changing means includes a plurality of controllable canard surfaces.

8. The improvement according to claim 1, wherein said capsule is substantially conically shaped.

9. The improvement according to claim 1, wherein said capsule includes a canopy overlying the pilot, said extraction means includes a tractor rocket and means for removing said canopy from said capsule before actuating said tractor rocket.

10. The improvement according to claim 9, wherein said changing means includes a rocket for positively accelerating said capsule forward and upward relative to said main fuselage.

11. The improvement according to claim 10, wherein said changing means includes a plurality of thrust vector control rockets for adjusting the attitude of said capsule along the yaw, pitch and roll axes thereof.

12. The improvement according to claim 11, wherein said changing means includes a plurality of stabilizing flaps.

13. The improvement according to claim 11, wherein said capsule includes a plurality of controllable canard surfaces.

14. The improvement according to claim 11, wherein said capsule is substantially conically shaped.

15. The improvement according to claim 1, wherein said extraction means is coupled to a harness worn by the pilot, said harness carrying a parachute for the pilot.

* * * * *